United States Patent
Cho (10) Patent No.: US 8,057,058 B2
(45) Date of Patent: Nov. 15, 2011

(54) LIGHTING DEVICE FOR DISPLAY DEVICE, DISPLAY DEVICE AND TELEVISION RECEIVER

(75) Inventor: Shiyoshi Cho, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 163 days.

(21) Appl. No.: 12/672,097

(22) PCT Filed: Mar. 24, 2008

(86) PCT No.: PCT/JP2008/055412
§ 371 (c)(1),
(2), (4) Date: Feb. 4, 2010

(87) PCT Pub. No.: WO2009/019907
PCT Pub. Date: Feb. 12, 2009

(65) Prior Publication Data
US 2011/0149176 A1 Jun. 23, 2011

(30) Foreign Application Priority Data
Aug. 8, 2007 (JP) .................................. 2007-206861

(51) Int. Cl.
*G09F 13/08* (2006.01)
(52) U.S. Cl. ..................... 362/97.4; 362/97.1; 362/97.2; 349/64
(58) Field of Classification Search ........ 362/97.1–97.2, 362/97.4; 349/64, 70
See application file for complete search history.

(56) References Cited

U.S. PATENT DOCUMENTS

| 2006/0018130 A1 | 1/2006 | Lee |
| 2007/0070285 A1* | 3/2007 | Liu et al. .................. 349/156 |
| 2009/0231835 A1* | 9/2009 | Roberts et al. ............... 362/97.3 |

FOREIGN PATENT DOCUMENTS

| CN | 1588658 A | 3/2005 |
| CN | 1725083 A | 1/2006 |
| CN | 2800324 Y | 7/2006 |
| JP | 2004-206906 A | 7/2004 |
| JP | 2004-265709 A | 9/2004 |
| JP | 2006-208466 A | 8/2006 |
| JP | 2006-276875 A | 10/2006 |
| JP | 2007-102066 A | 4/2007 |

OTHER PUBLICATIONS

Official Communication issued in International Patent Application No. PCT/JP2008/055412, mailed on Jun. 3, 2008.

* cited by examiner

*Primary Examiner* — Robert May
(74) *Attorney, Agent, or Firm* — Keating & Bennett, LLP (57) ABSTRACT

A lighting device for a display device includes a light source, an optical member arranged on the light emitting side of the light source, and a support member arranged to support the optical member from the light source side. A recess portion arranged to accommodate the distal end portion of the support member is provided in the surface of the optical member that faces the light source, and the recess portion is arranged to overlap with the support member when seen in a planar view.

10 Claims, 11 Drawing Sheets

LIGHTING DEVICE FOR DISPLAY DEVICE, DISPLAY DEVICE AND TELEVISION RECEIVER

BACKGROUND OF THE INVENTION

1. Field of the Invention

The present invention relates to a lighting device for a display device, a display device and a television receiver.

2. Description of the Related Art

A liquid crystal display device used in a television receiver typically includes a liquid crystal panel and a backlight arranged on the backside of the liquid crystal panel. One of the known backlights includes light sources such as cold cathode tubes, a chassis arranged to contain the light sources and having an opening on the light emitting side, and optical members arranged to cover the opening of the chassis and having functions such as a function for diffusing or converting light from the light sources into more uniform flat light.

The optical members often include a diffuser plate, which includes a number of diffusing particles distributed over a light transmissive base member of a predetermined thickness. For example, the diffuser plate can be supported by a support portion provided on the chassis side, so that the peripheral edge thereof rests on the support portion. In this case, the inner portion of the diffuser plate or the portion on the inner side of the peripheral edge can be supported from the chassis side, by support members mounted to the chassis (as shown in JP-A-2004-265709, for example).

In some cases, the above diffuser plate may arch or deform resulting in warpage in response to increases in the internal temperature of the chassis due to heat from the lighted light sources, so as to bulge toward the light sources. The support members can support the deformed diffuser plate from below (i.e., from the light source side), so that a distance is maintained between the diffuser plate and the light sources. However, the diffuser plate may continue to deform causing further warpage, which results in deformation of the support members in the case of the above supporting structure. In the course of deformation of the support members due to the diffuser plate having largely deformed resulting in warpage, friction will occur between the diffuser plate and the support members, which may cause frictional noise. After further deformation of the support members, the support members may return to the original state as a result of the elastic restoration. At that time, friction will also occur between the diffuser plate and the support members, which may also cause frictional noise. The frictional noise thus generated is extremely uncomfortable for users, and can lead to reduction in quality of the backlight and therefore of the liquid crystal display device that includes the backlight.

SUMMARY OF THE INVENTION

In view of the foregoing circumstances, preferred embodiments of the present invention provide a high-quality lighting device for a display device by eliminating uncomfortable noise such as frictional noise. Also, preferred embodiments of the present invention provide a display device including the lighting device for a display device.

A lighting device for a display device, according to a preferred embodiment of the present invention, includes a light source, an optical member arranged on the light emitting side of the light source, and a support member arranged to support the optical member from the side of the light source. A recess portion arranged to accommodate the distal end portion of the support member is provided in the surface of the optical member that faces the light source, and the recess portion is arranged to overlap with the support member when seen in a planar view.

In the lighting device for a display device having the above construction, the recess portion arranged to accommodate the distal end portion of the support member is preferably provided in the optical member. The support member can support the optical member from the light source side so that a distance is maintained between the optical member and the light source, even when the optical member has deformed so as to cause warpage due to conditions including heat from the light source. According to this supporting structure, the support member can rest in the recess portion. Even if the optical member continues to deform creating further warpage and thereby causes deformation of the support member, friction between the optical member and the support member can be prevented because the support member rests in the recess portion. After further deformation of the support member, the support member may attempt to return to the original state by the elastic restoration. Also in this case, friction between the optical member and the support member can be prevented. Thus, frictional noise, which may be generated between the optical member and the support member due to warpage deformation (or deflection deformation) of the optical member, can be suitably prevented or minimized. Consequently, a high-quality lighting device for a display device can be provided.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
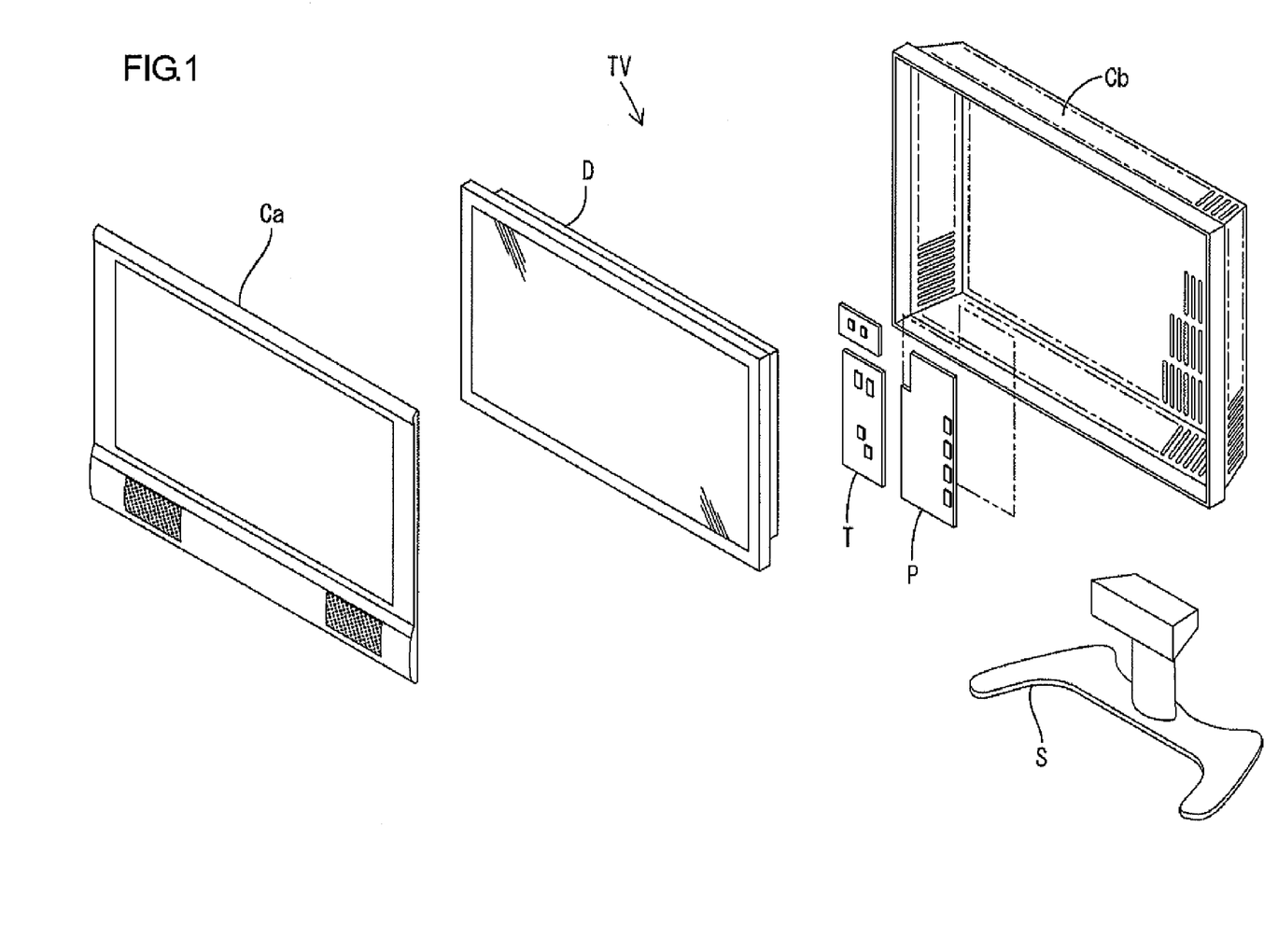
FIG. 1 is an exploded perspective view showing the general construction of a television receiver.
Figure 2:
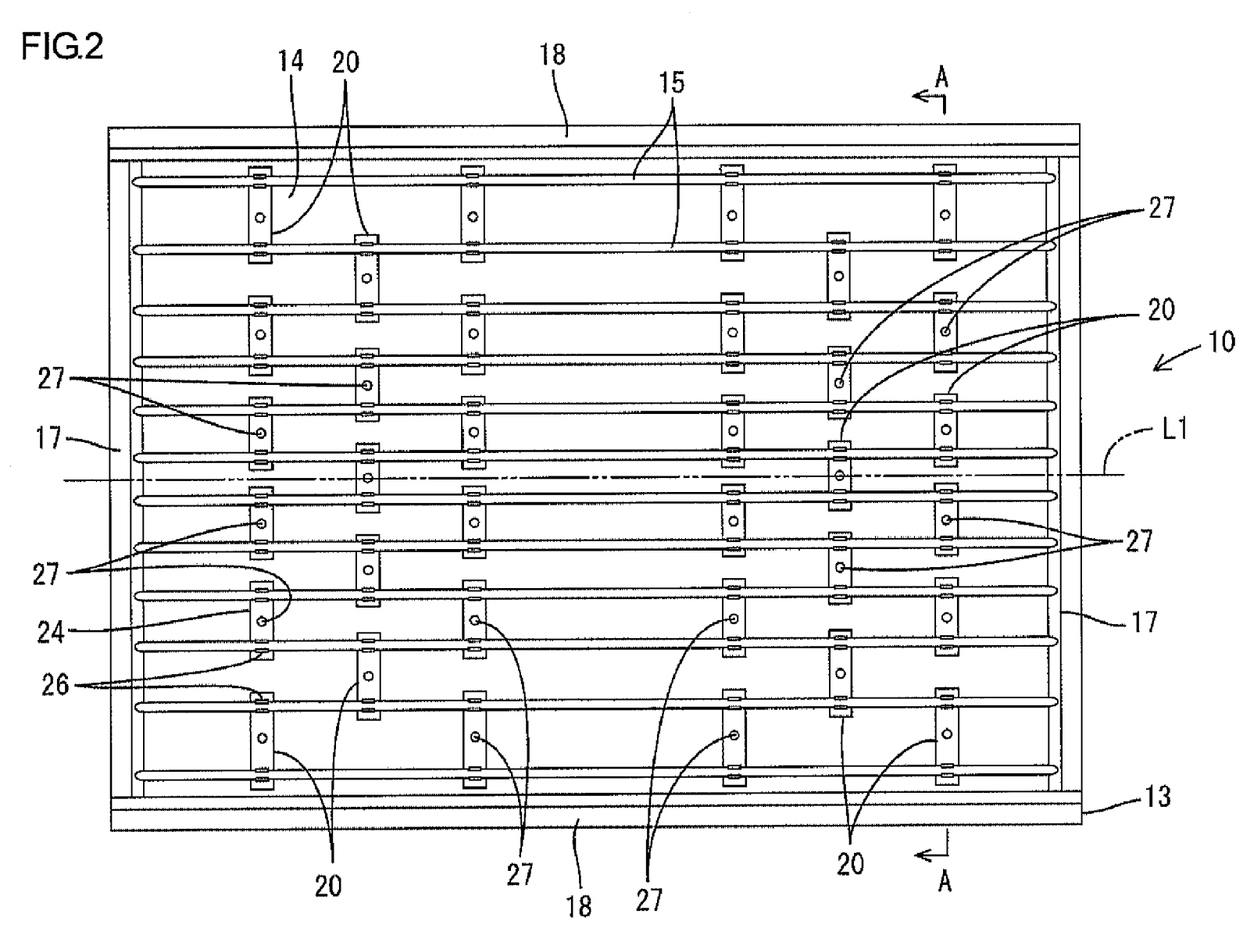
FIG. 2 is a plan view of a backlight included in a liquid crystal display device of the television receiver.
Figure 3:
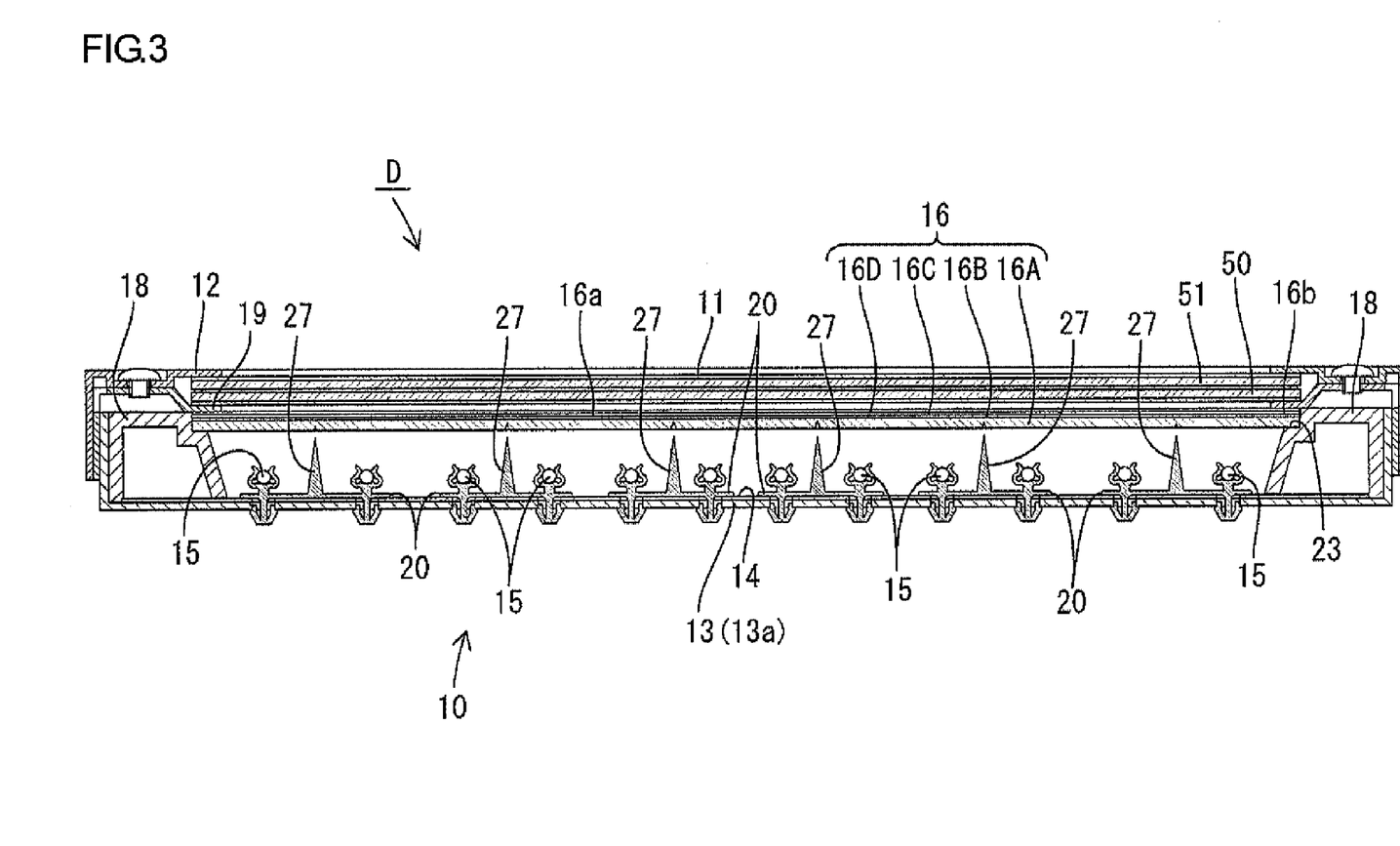
FIG. 3 is a sectional view of FIG. 2 along the line A-A.
Figure 4:
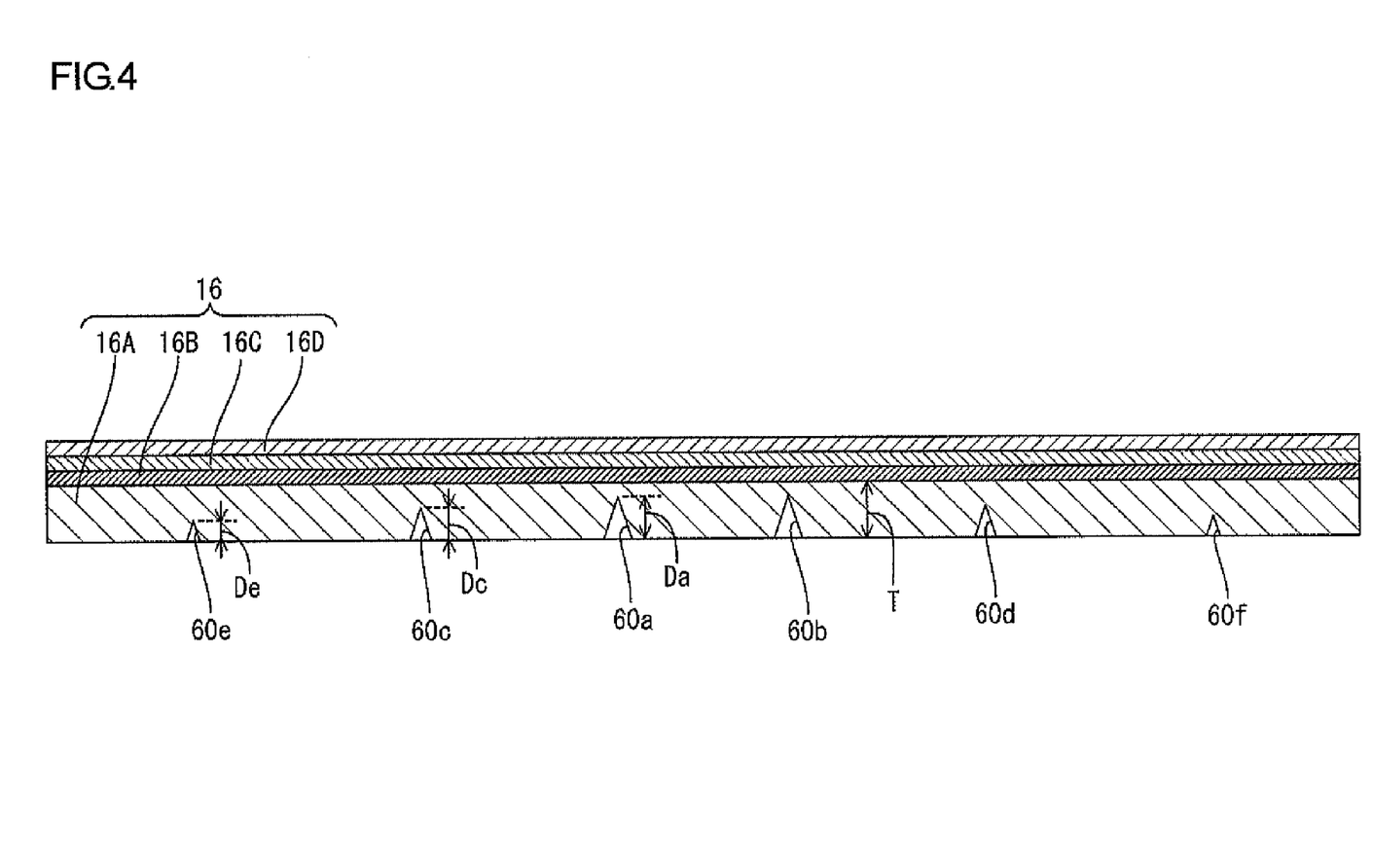
FIG. 4 is a schematic sectional view showing the configuration of optical members.
Figure 5:
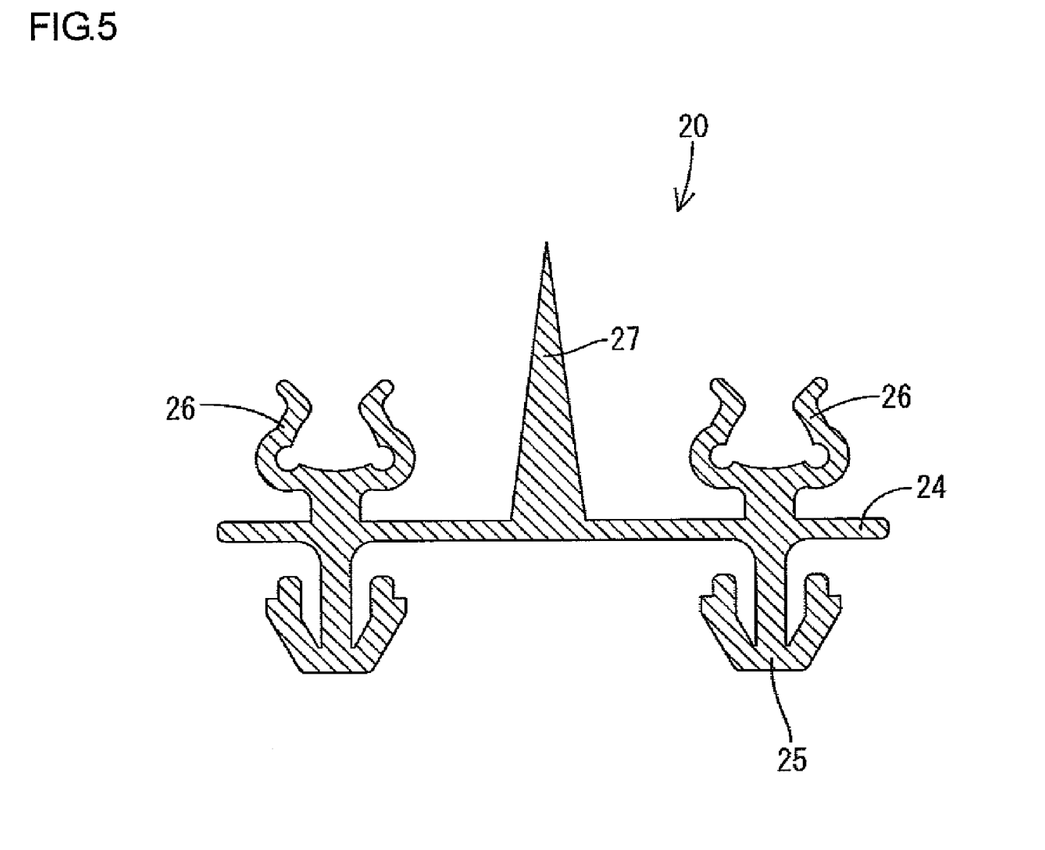
FIG. 5 is a side view showing the construction of a lamp clip.
Figure 6:
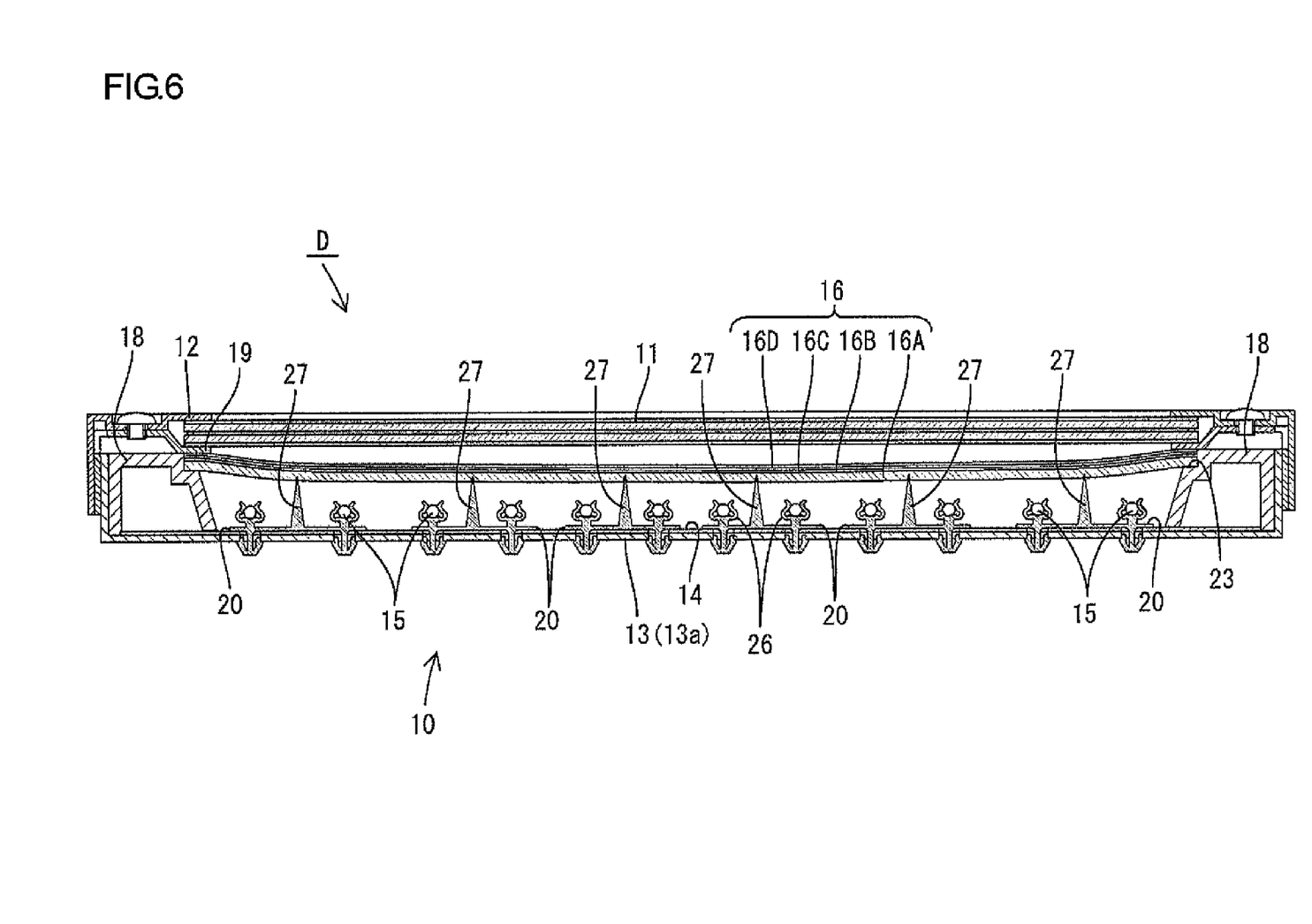
FIG. 6 is an explanatory diagram showing the operation of a preferred embodiment of the present invention.

Preferred embodiments according to the present invention will be hereinafter explained with reference to the drawings. FIG. 1 is an exploded perspective view showing the general construction of a television receiver TV according to a preferred embodiment of the present invention. FIG. 2 is a plan view of a backlight 10 included in a liquid crystal display device D of the television receiver TV. FIG. 3 is a sectional view of FIG. 2 along the line A-A. FIG. 4 is a schematic sectional view showing the configuration of optical members 16. FIG. 5 is a side view showing the construction of a lamp clip 20. FIG. 6 is an explanatory diagram showing the operation of the present preferred embodiment.

The television receiver TV shown in FIG. 1 includes the liquid crystal display device (display device) D, and front and back cabinets Ca and Cb arranged to hold the liquid crystal display device D therebetween. Further included are a power source P, a tuner T and a stand S.

The liquid crystal display device D preferably has a horizontally-elongated rectangular shape as a whole, and includes a liquid crystal panel 11 as a display panel and a backlight 10 as an external light source (or lighting device) for the liquid crystal panel 11, which are covered with a bezel 12 on the front side and thereby are held in an assembled state, as shown in FIG. 3. The liquid crystal panel 11 is disposed on the front side of the backlight 10, so that the backlight 10 can illuminate the liquid crystal panel 11 from the back side.

Referring to FIG. 3, the liquid crystal panel 11 has a well-known construction, in which the gap between a TFT substrate (or element substrate) 50 capable of light transmission and a CF substrate (or opposite substrate) 51 also capable of light transmission is filled with liquid crystal as a material with an optical property that changes with applied voltage. TFTs (Thin Film Transistors), as switching elements connected to source wiring lines and gate wiring lines extending at right angles to each other, are provided on the TFT substrate 50. On the CF substrate 51, color sections of three colors, i.e., Red (R), Green (G) and Blue (B), are arranged in a matrix. Further, on each of the substrates, a polarizing plate is attached to its surface on the opposite side of the liquid crystal side.

The backlight 10 is a so-called direct-light type backlight device (lighting device for a display device) that includes a plurality of linear light sources (e.g., cold cathode tubes (tubular light sources) 15 as high-pressure discharge tubes, in the present preferred embodiment), which are positioned directly below the back surface of the liquid crystal panel 11 (i.e., the panel surface on the opposite side of the display side), and are arranged along the panel surface. Specifically, the backlight includes a chassis 13 having an opening on its obverse side or light emitting side (i.e., front side or upper side in FIG. 3), a reflective sheet 14 laid in the chassis 13, a plurality of cold cathode tubes 15 housed in the chassis 13, and optical members 16 arranged on the light emitting side of the cold cathode tubes 15 so as to cover in the opening of the chassis 13. Further included are positioning members provided to enable positioning of the optical members 16, and a plurality of lamp clips (light source holding members) 20 arranged to mount the cold cathode tubes 15 on chassis 13. The positioning members include lamp holders 17 (See FIG. 2) and holders 18, which are arranged to define a frame-shaped support member arranged to support the peripheral edge portions 16b of the optical members 16 from the back side. The positioning members further include a frame 19, which is arranged on the front side of the optical members 16 so as to form a frame-shaped holding member arranged to hold the peripheral edge portions 16b of the optical members 16.

The chassis 13 is preferably made of metal, and substantially defined a shallow box-shaped configuration with open front, which has a rectangular or substantially rectangular shape when seen in a planar view, as shown in FIG. 2.

The reflective sheet 14 is preferably made of synthetic resin, and the surface thereof preferably is white in color or a color similar to white so as to have a superior reflective quality. The reflective sheet 14 is laid on the inner surface of the chassis 13 so as to cover almost the entire area thereof, as shown in FIG. 3. The reflective sheet 14 can effectively guide the light emitted from the cold cathode tubes 15 to the opening side of the chassis 13.

Each cold cathode tube 15 preferably is a kind of linear light source having an elongated shape, which extends in one direction along a planar direction of the optical members 16 or of the bottom plate 13a of the chassis 13. The cold cathode tubes are mounted in the chassis 13 so that the axial direction thereof conforms with the long-side direction of the chassis 13. The cold cathode tubes 15 are arranged at predetermined intervals so that the axes thereof are parallel to one another. The detailed explanation for the interval between adjacent cold cathode tubes 15 (i.e., pitch thereof or distance therebetween) is as follows. Referring to FIG. 2, the interval between cold cathode tubes 15 arranged to correspond to the center of the short side of the chassis 13 or of the optical members 16 is preferably set to be the smallest. The intervals are set to increase gradually from the center portion to the end portions. That is, the cold cathode tubes 15 are arranged in the chassis 13 so that the density thereof is high at the area corresponding to the center portion of the screen and is low at the areas corresponding to the end portions of the screen. The arrangement of cold cathode tubes 15 is preferably symmetric with respect to a line L1 located at the center of the short side of the chassis 13. Each cold cathode tube 15 includes an elongated glass tube having a circular section, and mercury or the like is encapsulated therein. Phosphor is applied to the inner wall surface thereof, and electrodes are enclosed in the respective end portions thereof.

The optical members 16 preferably have a rectangular or substantially rectangular shape when seen in a planar view, similar to that of the chassis 13 or the liquid crystal panel 11. The optical members preferably are mainly made of light transmissive material, and are arranged to cover in the opening of the chassis 13. Thus, the optical members are located between the liquid crystal panel 11 and the cold cathode tubes 15. The optical members 16 include a diffuser plate 16A, a diffusing sheet 16B, a lens sheet 16C and a reflective polarizing plate 16D, preferably arranged in this order from the cold cathode tube 15 side (i.e., back side or lower side in FIGS. 3 and 4), which are arranged in a stack. The optical members have functions such as a function for converting light emitted from the cold cathode tubes 15 into uniform flat light.

The diffuser plate 16A, i.e., the first one of the optical members 16 from the back side, has a thickness (e.g., about 2 mm) that is substantially larger than those of the other sheets 16B to 16D, and has a relatively high rigidity. The diffuser plate 16A is generally provided as a translucent member that can be formed by distributing a number of diffusing particles (e.g., Silica beads) over a transparent base member (e.g., light transmissive board made of resin such as polystyrene or polycarbonate) having a predetermined thickness.

In some cases, the diffuser plate 16A may deform so as to cause warpage due to the effect of the surrounding environment such as the temperature environment. In this case, the other sheets 16B to 16D will also deform to follow the warped or deformed diffuser plate 16A. If the optical members 16 arch or deform to bulge toward the liquid crystal panel 11, the central area of the liquid crystal panel 11 may be pressed by the optical members 16, which can cause a problem such as a display failure. In view of this, the diffuser plate 16A is subjected to a so-called warpage pre-treatment, so as to develop a warpage tendency to bulge toward the cold cathode tube 15 side. In a manufacturing process of the diffuser plate 16A, the warpage pre-treatment is achieved preferably by heating only the front surface thereof (i.e., the surface on the opposite side of the cold cathode tubes 15) during the passage of its base member between upper and lower rollers. Thereby, the diffuser plate 16A can develop a warpage tendency to deform into a shape in which the heat-treated surface sags toward the back side (or cold cathode tube 15 side) in the center portion or in the area at the center portion side of the peripheral edge portion 16b (See FIG. 6).

Because of the warpage pre-treatment, the diffuser plate 16A of the optical members 16 can arch or deform to bulge toward the cold cathode tubes 15 in the present preferred embodiment. In order to maintain a distance between the warped or deformed diffuser plate 16A and the cold cathode tubes 15, support pins (support members) 27 are provided to support the diffuser plate 16A from below (or from the cold cathode tube 15 side). In the present preferred embodiment, the support pins 27 are arranged on the lamp clips 20 provided for positioning and fixing the cold cathode tubes 15 on the chassis 13.

On the diffuser plate 16A or the first one of the optical members 16 from the cold cathode tube 15 side, recess portions 60 (60a to 60f) preferably having substantially mortar-shaped configuration are provided and arranged to overlap with the support pins 27 when seen in a planar view. The recess portions 60 have sizes and depths capable of accommodating the distal ends of the support pins 27. When the diffuser plate 16A has deformed to cause warpage, for example, the diffuser plate 16A can be supported on the support pins 27 while the support pins 27 rest in the recess portions 60. (The operation of the recess portions 60 will be described below.)

The lamp holders 17 are preferably made of synthetic resin, and the surfaces thereof are preferably white in color. Referring to FIG. 2, the lamp holders 17 are a pair of lamp holders, which are mounted to the two respective long-side-directional ends of the chassis 13 so as to extend along the short-side direction of the chassis 13. The lamp holders 17 have a substantially box-like shape with open back, which can collectively cover the front sides of the end portions (i.e., the portions having terminals) of the cold cathode tubes 15. A support portion capable of supporting the optical members 16 is provided as a stepped or depressed portion on the inner edge portion of the front surface of each lamp holder 17.

The holders 18 are preferably made of synthetic resin, and the surfaces thereof are preferably white in color. Referring to FIGS. 2 and 3, the holders 18 preferably include a pair of holders, which are mounted to the two respective short-side-directional ends of the chassis 13 so as to extend along the long-side direction of the chassis 13. A support portion 23 for the optical members 16, similar to that of the lamp holder 17, is provided as a stepped or depressed portion on the inner edge portion of the front surface of each holder 18.

The frame 19 preferably has a frame-shaped configuration and is made of metal, which can be arranged on the front side of the optical members 16 so as to hold areas all around the peripheral edge portions 16b thereof, as shown in FIG. 3. A holding surface facing the planar surface of the optical member 16 is provided on the inner edge portion of the frame 19. In an assembled state, the holding surface can be arranged so that a small clearance space is left between the holding surface and the front surface of the reflective polarizing plate 16D as the topmost optical member. The clearance space allows thermal expansion or contraction of the optical members 16.

The lamp clips 20 are preferably made of synthetic resin, and the entire surfaces thereof are preferably white in color so as to have superior light reflectivity. Specifically, referring to FIGS. 2, 3 and 5, each lamp clip includes a mounting plate 24 to be attached to the bottom plate 13a of the chassis 13, engaging portions 25 projecting from the mounting plate 24 to the back side, light source grippers 26 projecting from the mounting plate 24 to the front side (or to the optical member 16 side), and a support pin 27 projecting from the mounting plate 24 to the front side or the same side as the light source grippers 26.

The mounting plate 24 preferably has an elongated plate-shaped configuration, which can be arranged to extend along the short-side direction of the chassis 13 when it is mounted to the chassis 13. The engaging portions 25 as a pair of engaging portions are arranged on the back surface of the mounting plate 24. The engaging portions can pass through mounting holes provided on the chassis 13, and engage with the back-side opening edges of the chassis 13. Thereby, the lamp clip 20 can be mounted and held on the chassis 13.

On the other hand, the light source grippers 26 as a pair of light source grippers capable of grasping cold cathode tubes 15 are arranged on the front surface of the mounting plate 24. The light source grippers 26 are arranged to overlap with the engaging portions 25 when seen in a planar view. Each light source gripper 26 preferably has a substantially U-shaped cross section with an open front, so that a cold cathode tube 15 can be mounted thereto through the front opening. The light source gripper 26 can deform elastically during attachment or detachment of the cold cathode tube 15. Due to the light source grippers, the cold cathode tubes 15 are held at a predetermined height from the bottom plate 13a of the chassis 13.

On the front surface of the mounting plate 24, the support pin 27 is arranged between the two light source grippers 26. Specifically, the support pin 27 is preferably located right at the middle position on the mounting plate 24, i.e., at the middle position between the two light source grippers 26. The support pin 27 is set to have a larger projecting height than the light source grippers 26. The cross section of the support pin 27 along a planar direction of the diffuser plate 16A preferably has a circular shape or a substantially circular shape, for example. The diameter thereof gradually decreases from the proximal end to the distal end, so as to form a tapered shape. That is, the support pin 27 generally has a conical pin shape. However, the support pin 27 is not limited to having a conical shape, but rather may have another tapered shape such as a pyramidal shape.

Due to the support pins 27 with the distal ends (or apexes) being in contact with the diffuser plate 16A, the diffuser plate 16A can be held at a predetermined horizontal position. The end portion of each support pin 27 that faces the surface of the diffuser plate 16A has a substantially point-shaped configuration. When the lamp clips 20 are mounted to the chassis 13, the light source grippers 26 are located at the mounting positions of cold cathode tubes 15 while the support pins 27 are located between adjacent cold cathode tubes 15.

When the diffuser plate 16A is heated by radiation from the cold cathode tubes 15, for example, the diffuser plate 16A can arch or deform into a shape in which it sags toward the cold cathode tube 15 side in the center portion as shown in FIG. 6, because the diffuser plate 16A was subjected to warpage pre-treatment as described above. Specifically, the central portion 16a of the diffuser plate 16A arches or deforms to cause warpage, with supported points on its peripheral edge portion (or frame portion) 16b that is supported on the lamp holders 17 and holders 18. In response to the warpage of the diffuser plate 16A, the sheets 16B to 16D stacked on the front side thereof will also arch or deform to follow the warped diffuser plate 16A.

When the warpage deformation of the diffuser plate 16A proceeds to some extent, the distal ends of the support pins 27 are applied to the back surface of the diffuser plate 16A. Note that the support pins 27 are dispersed into the area corresponding to the diffuser plate 16A. On the other hand, the diffuser plate 16A includes the recess portions 60, which are located to overlap with the support pins 27 and are capable of accommodating the distal ends of the support pins 27. According to the construction, the support pins 27 can support the diffuser plate 16A from below, while resting in the recess portions 60 of the diffuser plate 16A.

Specifically, in the present preferred embodiment, the recess portions 60 are provided as shown in FIG. 4, in which the depth Da of the recess portion 60a located at the center portion or approximate center portion of the surface of the diffuser plate 16A is preferably larger than the depth Dc of the recess portion 60c located at the end portions. That is, in FIG. 4, the relationship "Da>Dc>De" is satisfied for depths Da, Dc and De. Further, in connection with the thickness T of the diffuser plate 16A, the relationship "$0.3\,T \leq D \leq T$" is satisfied for depths D of the recess portions 60. In the present preferred embodiment, the thickness T is set to about 2 mm, and therefore the depths D of the recess portions 60 are set to between about 0.6 mm and about 2 mm, for example. In the present preferred embodiment, the recess portions 60a and 60b on the center portion are the same in depth, while the recess portions 60c and 60d closer to the end portions are the same in depth. Further, the recess portions 60e and 60f closest to the ends are the same in depth.

The television receiver TV, the liquid crystal display device D and the backlight 10, which have the above constructions according to the present preferred embodiment, can provide the following operational effects.

The recess portions 60, which are located to overlap with the support pins 27 when seen in a planar view and are capable of accommodating the distal end portions of the support pins 27, are provided on the surface of the diffuser plate 16A that faces the cold cathode tubes 15. According to the construction, when the diffuser plate 16A has deformed to cause warpage as shown in FIG. 6, the support pins 27 can support the diffuser plate 16A from the cold cathode tube 15 side, so that a distance is maintained between the diffuser plate 16A and the cold cathode tubes 15. Thereby, troubles such as visible images of cold cathode tubes 15 can be prevented.

Particularly, according to the supporting structure for the diffuser plate 16A of the present preferred embodiment, the support pins 27 can rest in the recess portions 60. Even if the diffuser plate 16A continues to deform causing further warpage and thereby resulting in deformation of the support pins 27 attributable to the force of the warpage deformation applied to the support pins 27, friction between the diffuser plate and the support pins 27 does not occur because the support pins 27 rest in the recess portions 60. After further deformation of the support pins 27, the support pins may attempt to return to the original state by the elastic restoration. Also in this case, friction between the diffuser plate 16A and the support pins 27 does not occur. Thus, frictional noise, which may be generated between the diffuser plate 16A and the support pins 27 due to warpage deformation (or deflection deformation) of the diffuser plate 16A, is reliably prevented and minimized. Consequently, the television receiver TV can be provided as a high-quality television receiver that does not generate uncomfortable noise.

According to the present preferred embodiment, the support pins 27 can be readily placed into the recess portions 60, particularly due to the mortar-shaped configurations of the recess portions 60. Further, the support pins 27 resting in the recess portions 60 are less prone to friction with the inner surfaces of the recess portions 60.

Moreover, the recess portions are arranged so that the relationship "$0.3\,T \leq D \leq T$" is satisfied for the thickness T of the diffuser plate 16A and the depths D of the recess portions 60. If the depth D of the recess portion is smaller than about 0.3 T (e.g., the depth D is about 0.1 T, for example), the support pin 27 may fail to be placed into the recess portion 60. If the depth D is larger than T (e.g., the depth D is about 1.1 T, for example), the support pin 27 can penetrate through the diffuser plate 16A so as to reach its surface on the opposite side of the cold cathode tubes 15. In this case, the support pin 27 may have contact with another member (e.g., diffusing sheet 16B), and the shadow of the tip of the support pin 27 may be visible on the display device.

The support pin 27 is provided so that the frame portion thereof can be supported and fixed on the chassis 13. Further, the recess portions 60 thereof are arranged so that the recess portion 60a relatively arranged on the center portion has a larger depth (Da>Dc>De). When the diffuser plate 16A, with its frame portion supported on the chassis 13, deforms to cause warpage due to some reasons including heat, the warpage deformation is particularly large at the center portion. Therefore, the center portion thereof is prone to friction with the support pins 27. However, the relatively deep recess portions 60a are provided on the center portion, while the relatively shallow recess portions 60c, 60e are provided on the end portions, in the present preferred embodiment. Thereby, the friction at the center portion can be suitably prevented. That is, the load on the support pins 27 when the center portion has largely deformed to cause warpage can be reduced due to the relatively deep recess portions 60a accommodating the support pins 27. This makes the friction between the diffuser plate 16A and the support pins 27 unlikely, and consequently frictional noise can be suitably prevented or minimized.

Shown above is a preferred embodiment of the present invention. However, the present invention is not limited to the above preferred embodiment.

Figure 11:
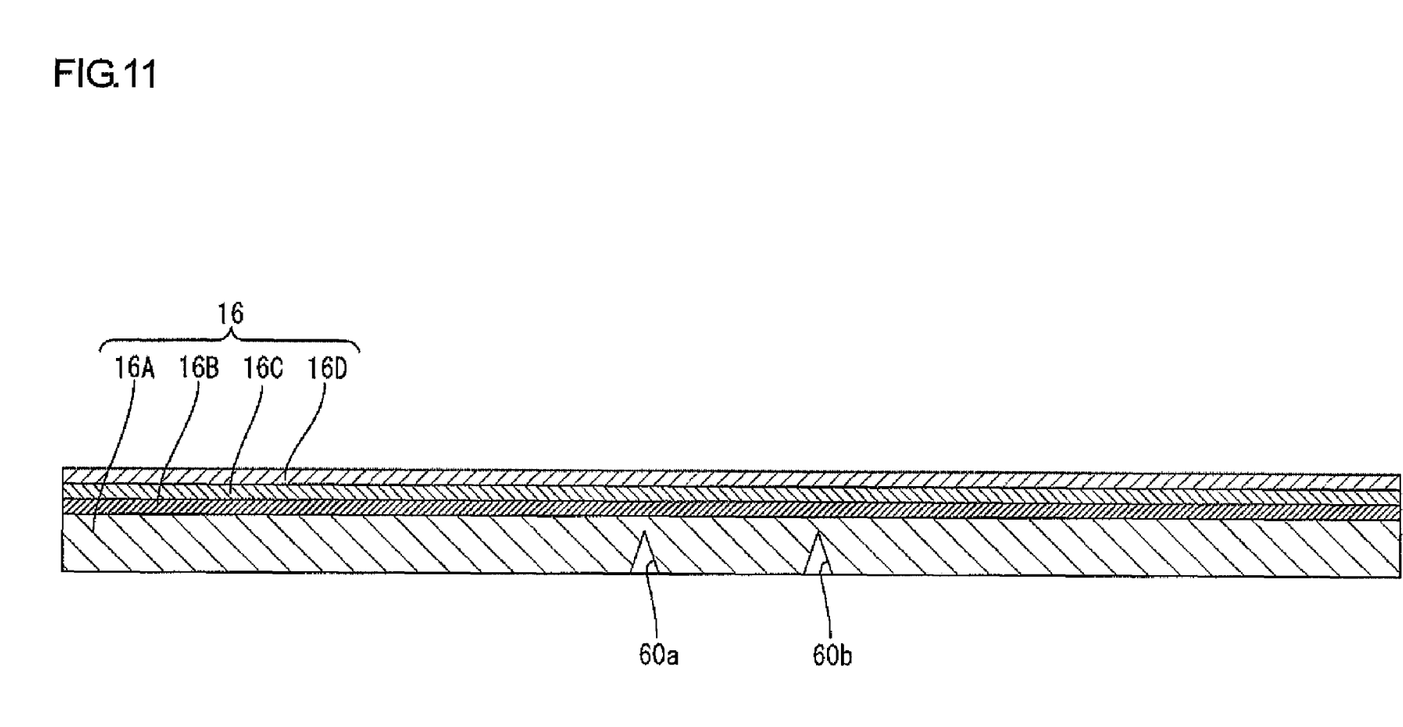
FIG. 11 is a schematic sectional view showing another modification of the diffuser plate (or optical member).

For example, recess portions 60 may be provided and located to overlap with some of the support pins 27 when seen in a planar view, in contrast to the above preferred embodiment in which recess portions 60 are provided and located to overlap with all the support pins 27 when seen in a planar view. Specifically, recess portions 60a, 60b may be provided solely in the vicinity of the center portion prone to large warpage deformation, as shown in FIG. 11. More specifically, the recess portions 60 may be preferably provided in the area within a half of the radius of the diffuser plate 16A from the center thereof.

Figure 7:
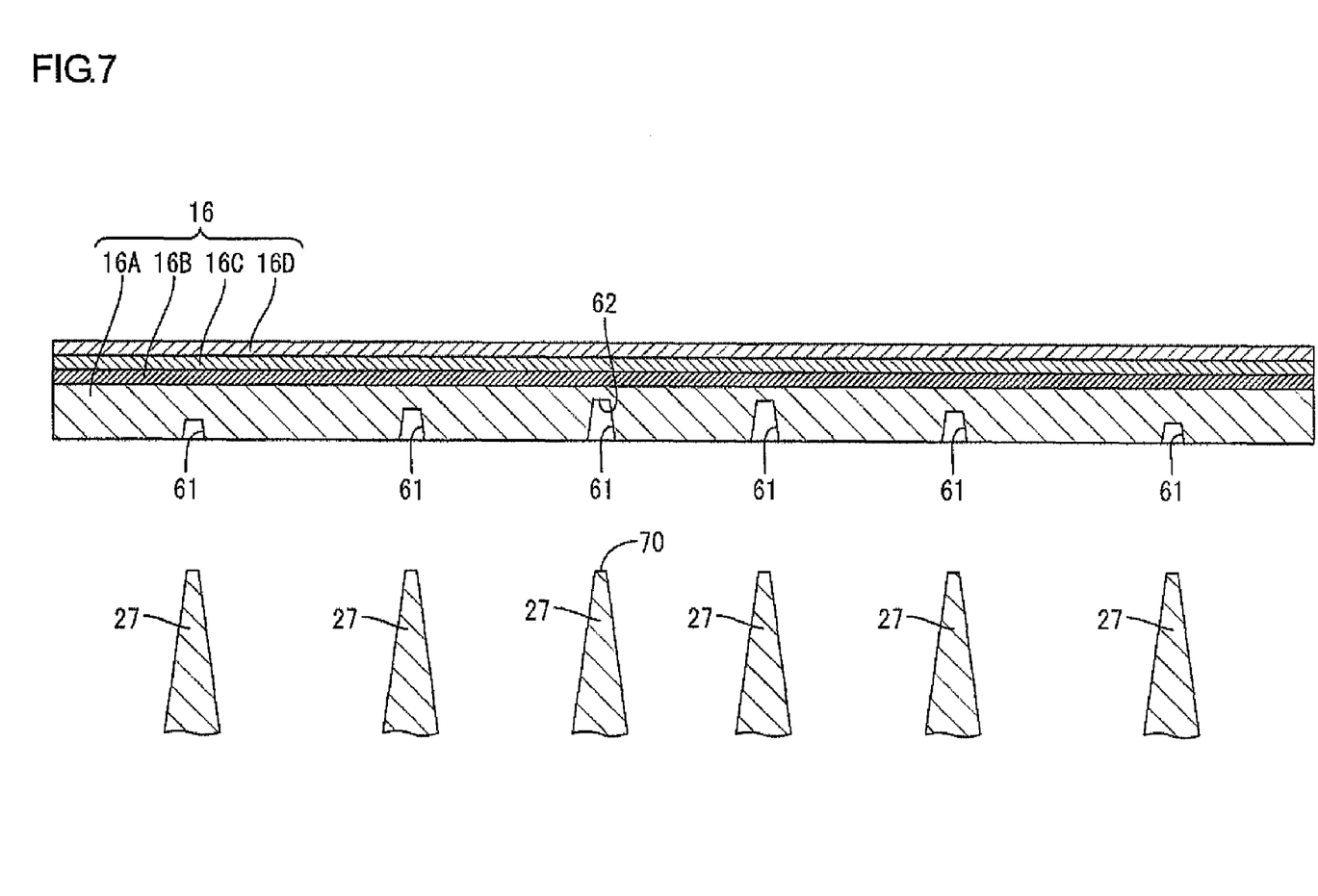
FIG. 7 is a schematic sectional view showing a modification of a diffuser plate (or optical member).

In the above preferred embodiment, each recess portion 60 preferably has a mortar-shaped configuration without the bottom surface. However, as shown in FIG. 7, recess portions 61 having bottom surfaces 62 may be provided on the diffuser plate 16A, for example. In this case, the distal ends 70 of the support pins 27 face the bottom surfaces 62 of the recess portions 61. At the time, they can abut on each other, depending on the planar dimensions of the bottom surfaces 62 and the distal ends 70. In view of this, the planar dimensions are preferably set so that the relationship "$S1 \leq S2$" is satisfied for the planar dimensions S1 of the bottom surfaces 62 of the recess portions 61 and the planar dimensions S2 of the distal surfaces 70 of the support pins 27. When the planar dimensions S1 of the bottom surfaces 62 of the recess portions 61 are thus set to be equal to or smaller than the planar dimensions S2 of the distal surfaces 70 of the support pins 27, friction between the bottom surfaces 62 of the recess portions 61 and the distal surfaces 70 of the support pins 27 can be prevented. Consequently, frictional noise can be suitably prevented or minimized. In connection with the tapered shapes of the support pins 27, the shape referred to as "a tapered shape" in the present invention is not limited to a shape having the pointed tip, but rather may include a shape obtained by partially removing the pointed end of a conical or pyramidal shape. Also included is a shape that has a curved distal surface as a result of removing the pointed end.

Figure 8:
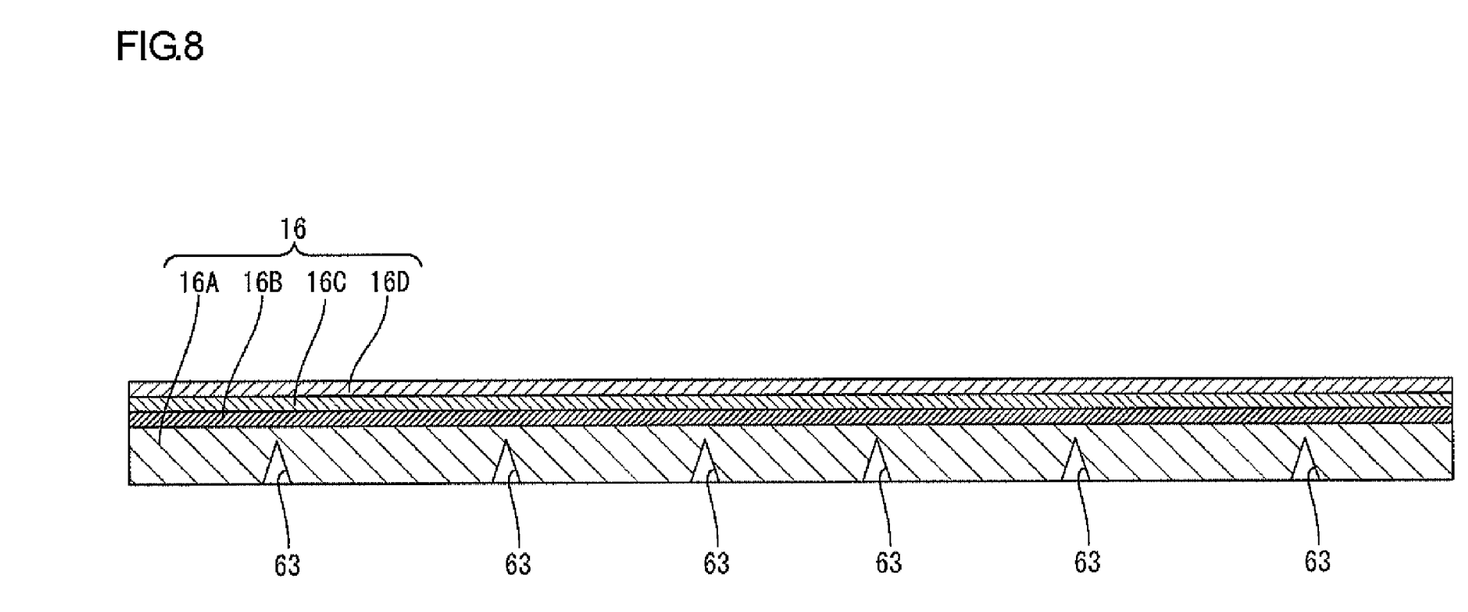
FIG. 8 is a schematic sectional view showing another modification of the diffuser plate (or optical member).

In the above preferred embodiment, the recess portion 60 at the center portion is preferably set to be relatively large in depth, while the recess portion 60 at the end portion is preferably set to be relatively small in depth. However, as shown in FIG. 8, recess portions 63 may have the same depth regardless of the locations thereof on the surface of the diffuser plate 16a, for example. This construction is particularly effective for a diffuser plate that is prone to uniform warpage deformation of its surface.

Figure 9:
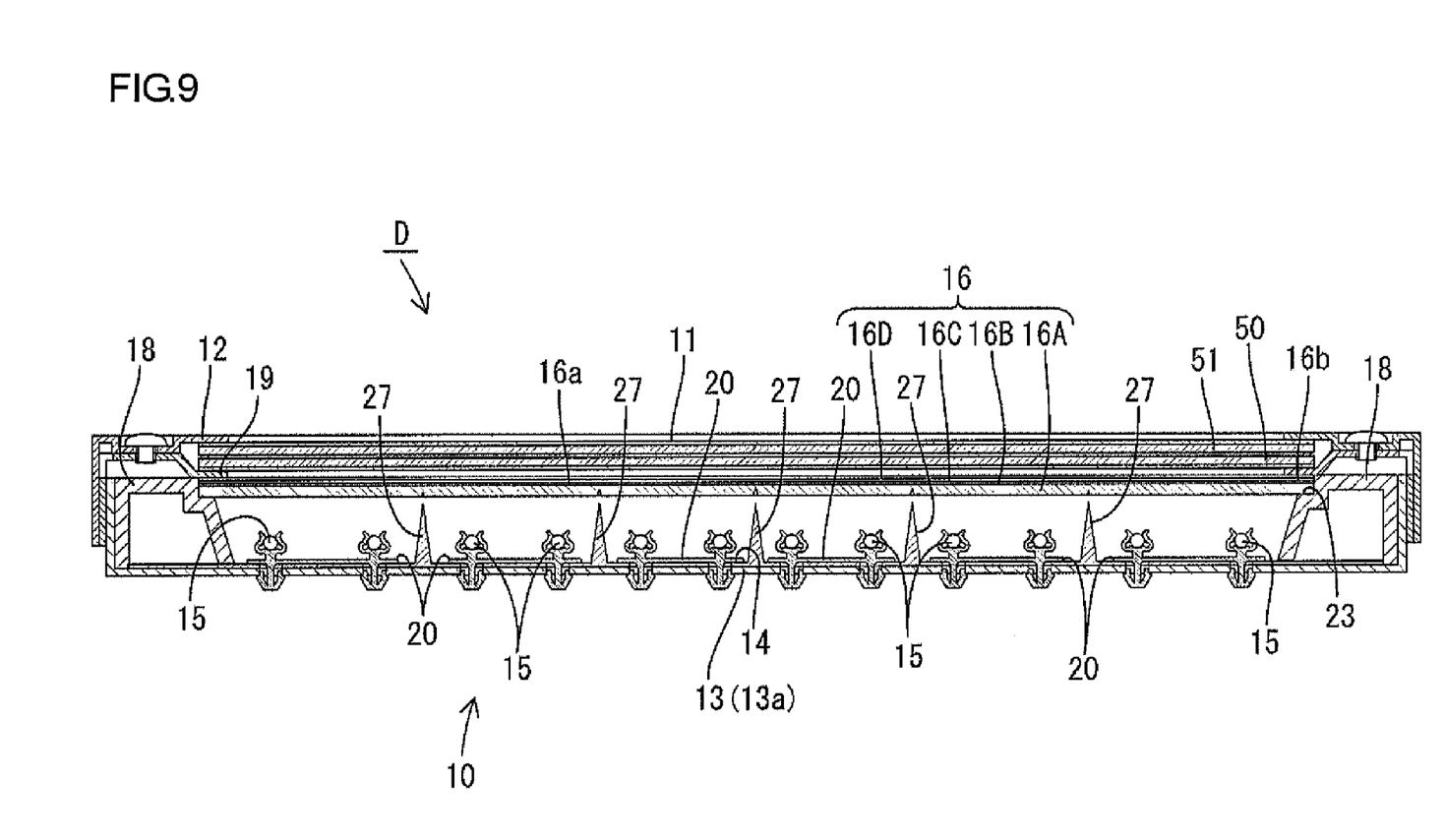
FIG. 9 is a sectional view showing a modification of the backlight.

In the above preferred embodiment, the support pins 27 are provided on the lamp clips 20, and therefore are mounted to the chassis 13 via the lamp clips 20. However, support pins 27 separate from lamp clips 20 may be provided directly on the chassis 13, as shown in FIG. 9, for example.

In the above preferred embodiment, the optical members 16 preferably include a diffuser plate 16A, a diffusing sheet 16B, a lens sheet 16C and a reflective polarizing plate 16D, arranged in this order from the cold cathode tube 15 side. However, a number of diffusing sheets differing in diffusion property may be provided as optical members on the diffuser plate 16A, which can be stacked in order from the cold cathode tube 15 side, for example. Alternatively, two lens sheets and a diffusing sheet may be stacked on the diffuser plate 16A, in which the lens sheets can be arranged so that the longitudinal directions (or focusing directions) of lenses thereof are shifted by 90 degrees from each other.

Figure 10:
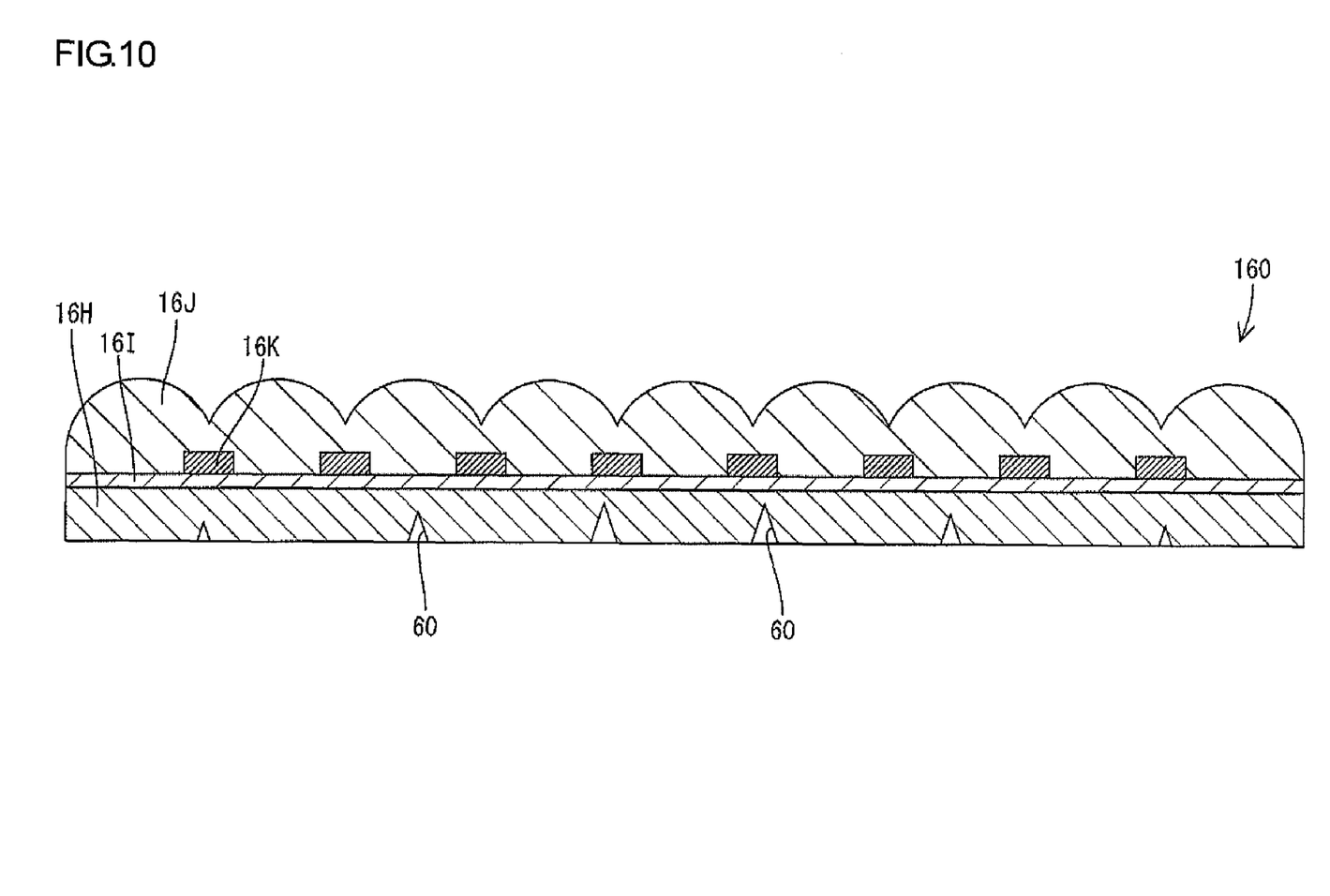
FIG. 10 is a schematic sectional view showing another modification of the diffuser plate (or optical member).

Moreover, an optical member 160 shown in FIG. 10 can be used instead, for example, in which a lens sheet 16J is arranged on a diffuser plate 16H via an adhesive layer 16I. On the lens sheet 16J of the optical member 160, reflective members 16K are arranged along respective areas between convex lenses.

In the above preferred embodiment, the cold cathode tubes 15 are unequally spaced (to form an unequal lamp-pitch structure). However, the cold cathode tubes may be equally spaced to form an equal lamp-pitch structure. In the above preferred embodiment, the diffuser plate is preferably subjected to warpage pre-treatment. However, the pre-treatment is not necessary and can be omitted. In the above preferred embodiment, cold cathode tubes are preferably used as light sources. However, the present invention can be applied to a construction in which another type of linear light sources such as hot cathode tubes or point light sources such as LEDs are used as light sources. In the above preferred embodiment, a liquid crystal display device having a liquid crystal panel as a display panel is shown for illustrative purposes. However, the present invention can be applied to a display device that uses another type of display panel.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display device, comprising a lighting device comprising:
   a light source;
   an optical member arranged on a light emitting side of said light source; and
   a support member supporting said optical member from a side of said light source; and
   a display panel arranged to perform display by use of light from the lighting device for the display device; wherein said optical member includes a recess portion accommodating a distal end portion of said support member and provided in a surface of said optical member that faces said light source, and said recess portion is arranged to overlap with said support member when seen in view a planar view; and
   said optical member is a diffuser plane arranged to diffuse light from said light source.

2. The lighting device for a display device according to claim 1, wherein said recess portion has a mortar-shaped configuration.

3. The lighting device for a display device according to claim 1, further comprising a chassis arranged to house said light source, wherein said support member is mounted to said chassis directly or indirectly via a separate member.

4. The lighting device for a display device, as in claim 3, wherein:
   said separate member defines a light source holding member that holds said light source; and
   said light source holding member is mounted to said chassis, and said support member is provided on said light source holding member.

5. The lighting device for a display device according to claim 3, wherein:
   said optical member includes a frame portion supported and fixed on said chassis; and
   said recess portion includes a plurality of recess portions arranged on the light-source-side surface of said optical member so that a depth of one of the plurality of recess portions located at a center portion of said light-source-side surface is larger than a depth of one of the plurality of recess portions arranged at an end portion of said light-source-side surface.

6. The lighting device for a display device according to claim 3, wherein:
   said optical member includes a frame portion supported and fixed on said chassis; and
   said recess portion is selectively arranged in a vicinity of a center portion of the light-source-side surface of said optical member.

7. The lighting device for a display device according to claim 1, wherein a planar dimension of a bottom surface of said recess portion and a planar dimension of a distal surface of said support member are set so that a relationship $S1 \leq S2$ is satisfied, where $S1$ is the planar dimension of the bottom surface of said recess portion and $S2$ is the planar dimension of the distal surface of said support member.

8. The lighting device for a display device according to claim 1, wherein a thickness of said optical member and a depth of said recess portion are set so that a relationship $0.3T \leq D \leq T$ is satisfied, where $T$ is a thickness of said optical member and $D$ is a depth of said recess portion.

9. The display device according to claim 1, wherein said display panel is a liquid crystal panel in which liquid crystal is sealed between a pair of substrates.

10. A television receiver comprising the display device according to claim 1.

* * * * *